No. 766,071. PATENTED JULY 26, 1904.
R. H. STEVENS & S. S. WALES.
ELECTRICAL QUICK RETURN SYSTEM.
APPLICATION FILED JAN. 2, 1903.

NO MODEL. 2 SHEETS—SHEET 1.

WITNESSES
INVENTORS

No. 766,071. PATENTED JULY 26, 1904.
R. H. STEVENS & S. S. WALES.
ELECTRICAL QUICK RETURN SYSTEM.
APPLICATION FILED JAN. 2, 1903.
NO MODEL. 2 SHEETS—SHEET 2.

WITNESSES
INVENTORS
R. H. Stevens
S. S. Wales

No. 766,071.

Patented July 26, 1904.

UNITED STATES PATENT OFFICE.

RICHARD H. STEVENS AND SAMUEL S. WALES, OF MUNHALL, PENNSYLVANIA.

ELECTRICAL QUICK-RETURN SYSTEM.

SPECIFICATION forming part of Letters Patent No. 766,071, dated July 26, 1904.

Application filed January 2, 1903. Serial No. 137,443. (No model.)

*To all whom it may concern:*

Be it known that we, RICHARD H. STEVENS and SAMUEL S. WALES, of Munhall, in the county of Allegheny and State of Pennsylvania, have invented a new and useful Electrical Quick-Return System, of which the following is a full, clear, and exact description, reference being had to the accompanying drawings, forming part of this specification, in which—

Figure 1:
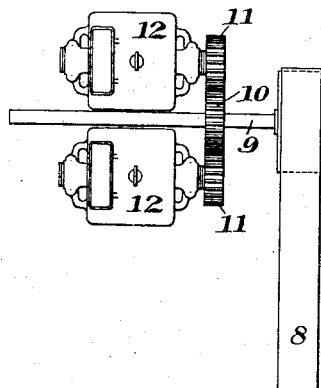
Figure 1:
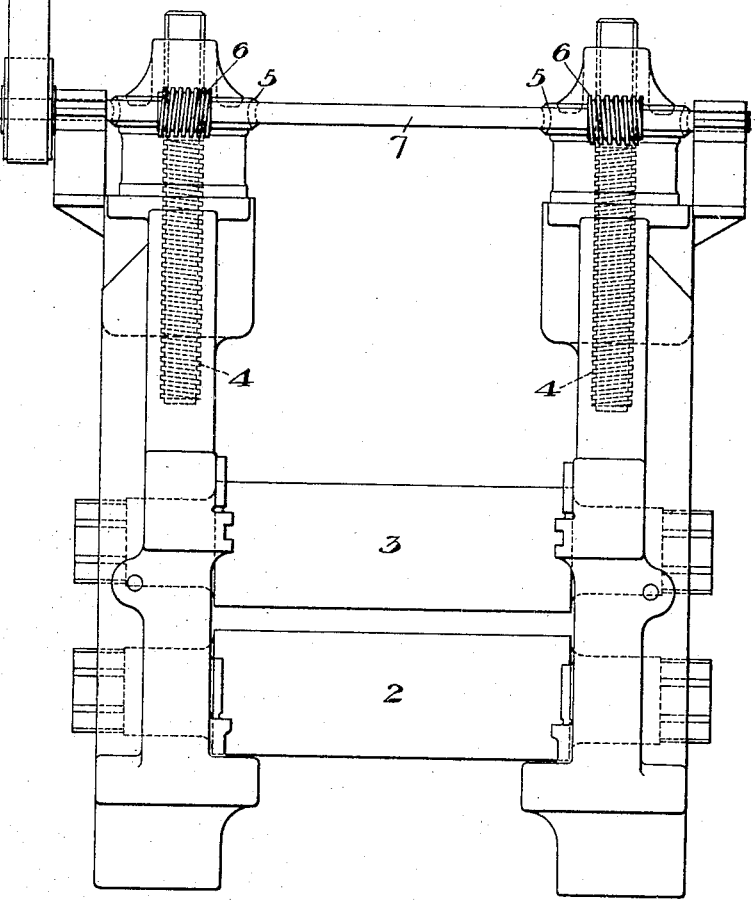
Figure 2:
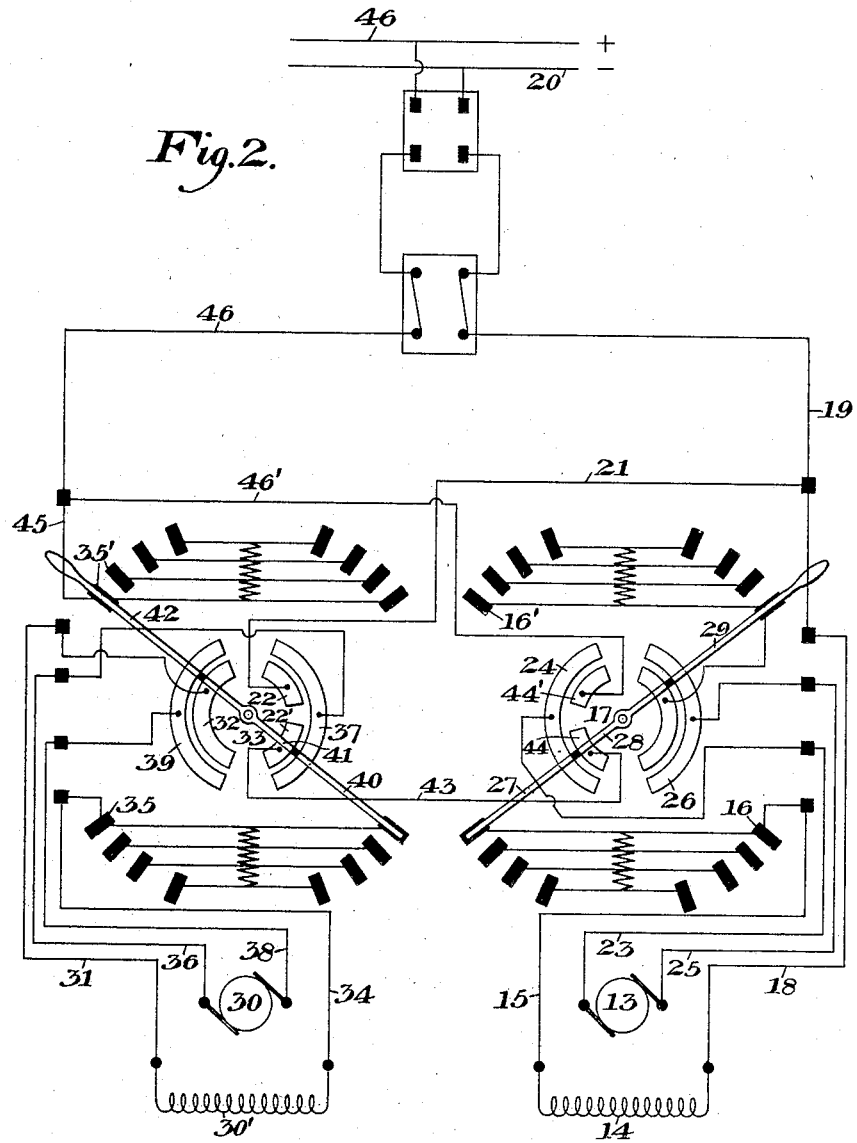

Figure 1 is a front elevation of a reversing-mill provided with our improved adjusting apparatus, and Fig. 2 is a diagrammatic view illustrating the electrical connections.

Our invention relates to the quick-return devices, especially those for adjusting the movable roll or rolls of rolling-mills, and is designed to reduce the time interval in restoring the roll to its original position after a piece has been rolled and preparatory to starting in the next piece, and thereby increase the output of the mill.

The invention consists in providing a plurality of electric motors, the electrical connections of which are always shifted from series to parallel whenever the direction of rotation of the motors is reversed. By this system the adjusting mechanism may be turned slowly and accurately in one direction and a quick movement imparted whenever the motors are reversed.

In the drawings, in which we have shown our invention as applied to a two-high reversing-mill, 2 is the lower stationary roll, 3 the upper movable roll, and 4 4 the adjusting-screws having squared shafts extending through worm-wheels 5 5, engaging worms 6 6 on a common shaft 7. We have shown this shaft as having belt connection 8 with the shaft 9, having a toothed wheel 10 engaged by the pinions 11 of two electric motors 12. These motors are so connected that when the controller is actuated to move the screws downwardly the motors are in series, whereas when the controller is reversed to move the roll upwardly they are placed in parallel, and their power and speed thereby greatly increased, giving a quick-return movement for the roll.

In Fig. 2 we show diagrammatically a system of connections which we prefer to use in shifting the electrical connections, as described. In this figure 13 represents one of the motors, and 14 its field-coils. From the field-coil 14 a line 15 extends to the resistances 16 of a reversing-controller 17, the other line, 18, extending to the general negative line 20 through connection 19. From the connection 19 the wire 21 leads to the inner ring-segment 22 of the other reversing-controller, 33. From the motor-brushes of the motor 13 the line 23 leads to the reversing-ring 24 of the controller 17, which is connected, through the usual connecting controller-arm, to the resistances 16. From the other brush the line 25 is connected to the other ring, 26, which is connected by the other arm of the controller to the other resistance, 16'. We have shown the controller-arm diagrammatically in three sections 27, 28, and 29, insulated from each other, as indicated in the black spaces, this arm being in a position upon the first contacts of the two sets of resistances. In the connections for the other motor, 30, the line 31 from the field-coil 30' extends to the central ring-section 32 of the reversing-controller 33, while the other line, 34, extends through the set of resistances 35. The connection 36 from the one brush of the motor 30 leads to the outer reversing-ring 37, while the other connection, 38, leads to the other ring, 39. The reversing-arm in this case is again divided into three sections 40, 41, and 42, insulated from each other. In the position shown the lower section 40 connects to the first contacts of the lower resistances. The central portion 41 contacts with the inner ring 32, the segment 22', from which the connection 43 extends to the corresponding segment-ring 44 of the other controller, 44', being the companion segment therein. In the reverse position the central portion 41 makes corresponding connection between 32 and segment 22. The third section 42 connects segment 39 to the first of the upper resistances 35', from which the wire 45 extends to the main line 46. This main-line wire is also extended at 46' to segment-ring 44' of the first controller 17.

When the arms are in the position indicated, the motors are in series, this position and the successive positions thereafter being used in screwing down the upper roll to the desired points. After the piece has been rolled the connected arms of the two controllers are reversed, when the direction of the current is reversed and the motors are placed in parallel, thus giving greatly-increased power and speed, which will quickly return the screws to their original normal position, the mill then being ready for the next piece of metal.

The advantages of our invention result from the increase in speed in turning the screws in one direction over that in turning them in the opposite direction, since thereby the adjustments may be made with the usual accuracy, while a considerable amount of time is saved owing to the quick-return movement.

The electrical connections whereby the speed and power are increased on reversing the current may be varied widely, one or more motors may be used, the current may be varied in many other ways than that shown, and under our broader claims mechanical or other connections may be used instead of electrical means for increasing the speed on the reverse movement of the screws or adjusting mechanism.

We claim—

1. An electrical quick-return device, comprising adjusting mechanism, a plurality of electric motors, and means for shifting the electrical connections of the motors from series to parallel, and vice versa, whenever their direction of rotation is reversed; substantially as described.

2. In a quick-return device, an adjusting mechanism for rolls, a plurality of electric motors having actuated connections with the adjusting mechanism, and a controller arranged to shift the electrical connections of the motors from series to parallel, and vice versa, at their reversal of rotation of the motors; substantially as described.

In testimony whereof we have hereunto set our hands.

RICHARD H. STEVENS.
SAMUEL S. WALES.

Witnesses:
J. A. HAMILTON,
W. H. CORBETT.